United States Patent
Kothari et al.

(10) Patent No.: US 11,420,395 B2
(45) Date of Patent: Aug. 23, 2022

(54) REGION OF INTEREST MONITORING AND CONTROL FOR ADDITIVE MANUFACTURING

(71) Applicant: HEWLETT-PACKARD DEVELOPMENT COMPANY, L.P., Spring, TX (US)

(72) Inventors: Sunil Kothari, Palo Alto, CA (US); Juan Carlos Catana, Guadalajara (MX); Tod Heiles, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 92 days.

(21) Appl. No.: 16/606,741

(22) PCT Filed: Apr. 30, 2018

(86) PCT No.: PCT/US2018/030228
§ 371 (c)(1),
(2) Date: Oct. 19, 2019

(87) PCT Pub. No.: WO2019/212492
PCT Pub. Date: Nov. 7, 2019

(65) Prior Publication Data
US 2021/0362428 A1    Nov. 25, 2021

(51) Int. Cl.
*B29C 64/393* (2017.01)
*G06T 7/66* (2017.01)
(Continued)

(52) U.S. Cl.
CPC .......... *B29C 64/393* (2017.08); *B29C 64/112* (2017.08); *G06T 7/0004* (2013.01); *G06T 7/66* (2017.01); *G06T 2207/30164* (2013.01)

(58) Field of Classification Search
CPC ..... B29C 64/112; B29C 64/393; B33Y 50/02; G06T 2207/30164; G06T 7/0004; G06T 7/66
See application file for complete search history.

(56) References Cited

U.S. PATENT DOCUMENTS

| | | |
|---|---|---|
| 5,430,666 A | 7/1995 | DeAngelis et al. |
| 9,522,426 B2 | 12/2016 | Das et al. |

(Continued)

FOREIGN PATENT DOCUMENTS

| | | |
|---|---|---|
| WO | WO2015174919 A1 | 11/2015 |
| WO | WO2017085470 A1 | 5/2017 |
| WO | WO2018022001 A1 | 2/2018 |

OTHER PUBLICATIONS

Baumann et al. "Vision based error detection for 3D printing processes" (Year: 2016).*

(Continued)

*Primary Examiner* — Yuhui R Pan
(74) *Attorney, Agent, or Firm* — Mannava & Kang

(57) ABSTRACT

In some examples, with respect to region of interest monitoring and control for additive manufacturing, a blob detection analysis may be performed on first and second component images associated with additive manufacturing of a component, and blobs that remain a same shape and include same centroids on the first and second component images may be identified. A further blob detection analysis may be performed on first and second thermal images associated with the first and second component images, and a determination may be made as to whether one of the identified blobs includes a same shape and a different centroid between the first and second thermal images. Based on a determination that the one of the identified blobs includes the same shape and the different centroid, an indication of a thermal camera misalignment associated with the additive manufacturing may be generated.

15 Claims, 12 Drawing Sheets

(51) Int. Cl.
*B29C 64/112* (2017.01)
*G06T 7/00* (2017.01)

(56) References Cited

U.S. PATENT DOCUMENTS

| | | | |
|---|---|---|---|
| 2002/0054312 A1* | 5/2002 | Tomita | G06F 3/1254 |
| | | | 358/1.13 |
| 2016/0236414 A1 | 8/2016 | Reese et al. | |
| 2016/0295208 A1* | 10/2016 | Beall | G06T 7/33 |
| 2017/0249745 A1 | 8/2017 | Fiala | |
| 2017/0297095 A1 | 10/2017 | Zalameda et al. | |
| 2017/0348900 A1 | 12/2017 | Williams et al. | |
| 2018/0124341 A1* | 5/2018 | Harding | H04N 1/00827 |

OTHER PUBLICATIONS

Sohn "Extraction of buildings from high-resolution satellite data and LIDAR" (Year: 2004).*
Al Faruque, M. A. et al., "Forensics of Thermal Side-Channel in Additive Manufacturing Systems", Jan. 15, 2016, CECS.
Baumann, Felix et al., "Vision based error detection for 3D printing processes" In MATEC web of conferences, vol. 59 (2016): 06003.

* cited by examiner

```
                                    1000
┌─────────────────────────────────────────────────────────────┐
│  IDENTIFY, BASED ON BLOB DETECTION ANALYSIS ON FIRST AND    │
│  SECOND COMPONENT IMAGES ASSOCIATED WITH ADDITIVE           │
│  MANUFACTURING OF A COMPONENT, BLOBS THAT REMAIN A          │
│  GENERALLY SAME SHAPE AND INCLUDE GENERALLY SAME            │
│  CENTROIDS ON THE FIRST AND SECOND COMPONENT IMAGES         │
│                           1002                              │
└─────────────────────────────────────────────────────────────┘
                              │
                              ▼
┌─────────────────────────────────────────────────────────────┐
│  DETERMINE, BASED ON A FURTHER BLOB DETECTION ANALYSIS ON   │
│  FIRST AND SECOND THERMAL IMAGES ASSOCIATED WITH THE FIRST  │
│  AND SECOND COMPONENT IMAGES, WHETHER A PLURALITY OF THE    │
│     IDENTIFIED BLOBS INCLUDE GENERALLY SAME SHAPES AND      │
│  DIFFERENT CENTROIDS BETWEEN THE FIRST AND SECOND THERMAL   │
│                           IMAGES                            │
│                           1004                              │
└─────────────────────────────────────────────────────────────┘
                              │
                              ▼
┌─────────────────────────────────────────────────────────────┐
│     BASED ON A DETERMINATION THAT THE PLURALITY OF THE      │
│   IDENTIFIED BLOBS INCLUDE THE GENERALLY SAME SHAPES AND THE│
│   DIFFERENT CENTROIDS, GENERATE AN INDICATION OF A THERMAL  │
│      CAMERA MISALIGNMENT ASSOCIATED WITH THE ADDITIVE       │
│                      MANUFACTURING                          │
│                           1006                              │
└─────────────────────────────────────────────────────────────┘
                              │
                              ▼
┌─────────────────────────────────────────────────────────────┐
│                                                             │
│     PERFORMING, BASED ON THE GENERATED INDICATION, A        │
│   CORRECTIVE ACTION TO REALIGN A THERMAL CAMERA THAT        │
│       INCLUDES THE THERMAL CAMERA MISALIGNMENT              │
│                           1008                              │
│                                                             │
└─────────────────────────────────────────────────────────────┘
```

*FIG. 10*

REGION OF INTEREST MONITORING AND CONTROL FOR ADDITIVE MANUFACTURING

BACKGROUND

With respect to additive manufacturing, such as multi-jet fusion, a high-resolution camera may be used to take an image of a plurality of components that are being manufactured in a batch process. In this regard, as each layer of the components is being printed, the images taken by the high-resolution camera may be used to control manufacturing quality of the components. For example, the images taken by the high-resolution camera may be used to control component temperatures during the manufacturing process.

BRIEF DESCRIPTION OF DRAWINGS

Features of the present disclosure are illustrated by way of example and not limited in the following figure(s), in which like numerals indicate like elements, in which:

FIG. 10 illustrates an example flowchart of a method for region of interest monitoring and control for additive manufacturing.

DETAILED DESCRIPTION

Figure 1:
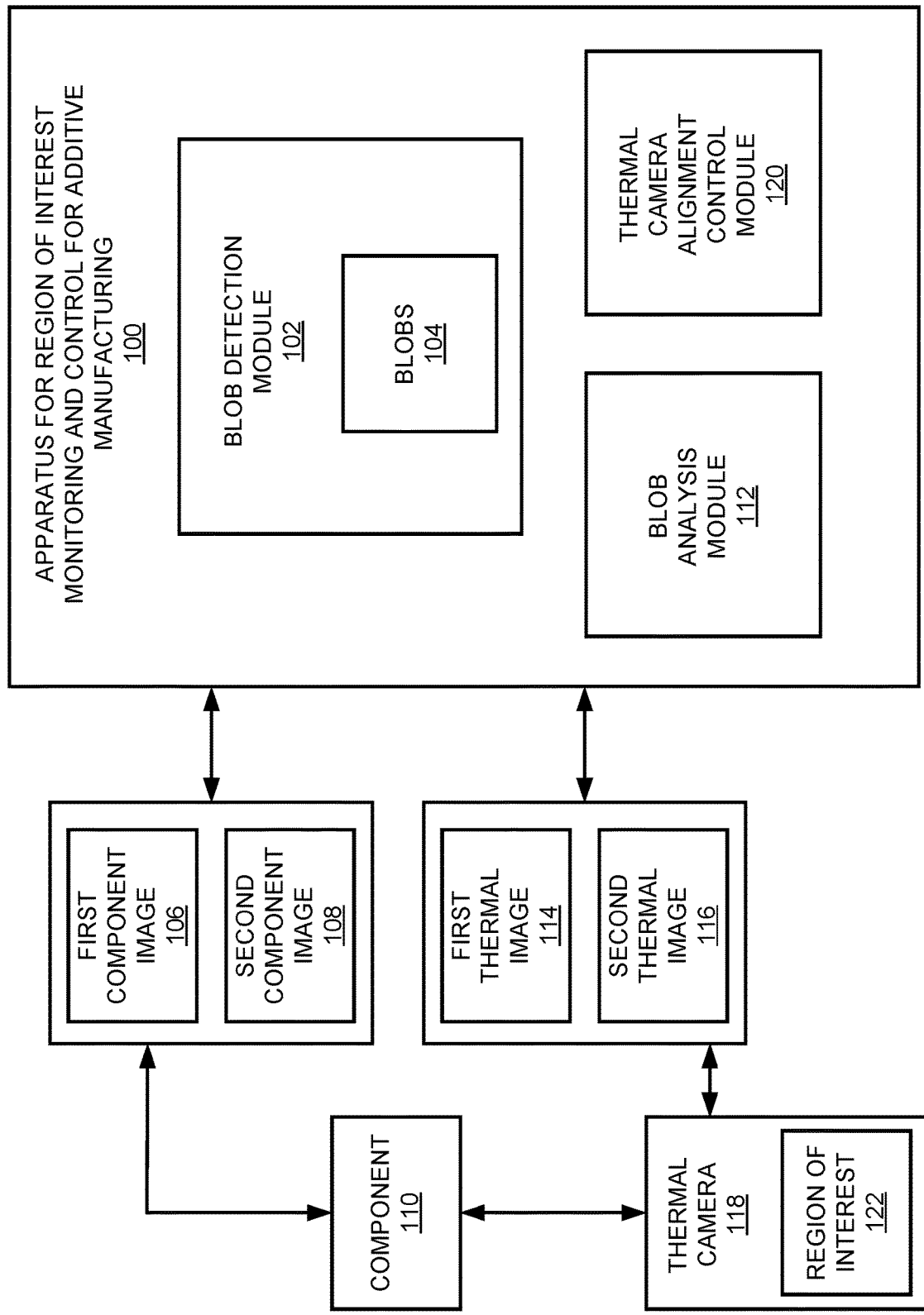
FIG. 1 illustrates an example layout of an apparatus for region of interest monitoring and control for additive manufacturing.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Apparatuses for region of interest monitoring and control for additive manufacturing, methods for region of interest monitoring and control for additive manufacturing, and non-transitory computer readable media having stored thereon machine readable instructions to provide region of interest monitoring and control for additive manufacturing are disclosed herein. The apparatuses, methods, and non-transitory computer readable media disclosed herein provide for the detection of thermal camera misalignment, for example, due to inadvertent thermal camera misalignment during thermal data acquisition in multi jet fusion additive manufacturing. In this regard, the thermal camera misalignment may be caused by external factors that affect the position or angle view of the snapshot taken by the thermal camera, which may lead to alterations in the field of view and quality of the data acquired.

With respect to additive manufacturing, multi jet fusion may represent a batch process where components that are being manufactured may be grouped together and printed in the same bucket. The components may be disposed on a bed, which may be encompassed by a frame. High resolution cameras may include thermal cameras for taking thermal images of the bed. These thermal cameras may be mounted on the frame that encompasses the bed, or another frame that is external to the printer that is used to manufacture the components.

With respect to the thermal images, the thermal camera may be aligned in accordance with a plurality of regions of interest on a thermal image. For example, the regions of interest may be described as pixel positions on the thermal image, where the pixel positions may be used to keep track of points of interest for feedback and control of component temperatures. The feedback and control of component temperatures may be used for applying lamp exposure, for thermo-mechanical strength correlations, for pass assignments, and for other factors related to component manufacturing. The thermal camera may be inadvertently misaligned, for example due to being "bumped", and other factors during the manufacturing process. This misalignment may lead to unintended shift in the regions of interest, which may degrade the manufacturing quality of the components. In this regard, it is technically challenging to determine whether the thermal camera has been misaligned. Further, it is technically challenging to determine a distance (e.g., angular and/or linear) by which the thermal camera has been misaligned to correct the thermal camera alignment.

In order to address the aforementioned technical challenges, the apparatuses, methods, and non-transitory computer readable media disclosed herein may perform a blob detection analysis, for example, to identify closed convex polygons, on first and second component images associated with additive manufacturing of a component. The first and second component images may include printer control language images. Based on the blob detection analysis, blobs that remain a same shape and include same centroids may be identified on the first and second component images. A further blob detection analysis may be performed on first and second thermal images associated with the first and second component images. In this regard, based on the further blob detection analysis, a determination may be made as to whether one of the identified blobs includes a same shape and a different centroid between the first and second thermal images. Further, based on a determination that the one of the identified blobs includes the same shape and the different centroid, an indication of a thermal camera misalignment associated with the additive manufacturing may be generated. With respect to the misalignment indication, a distance between a centroid of the one of the identified blobs in the first thermal image and a centroid of the one of the identified blobs in the second thermal image may be determined. Further, based on the determined distance, a region of interest associated with a thermal camera that is used to capture the first and second thermal images may be modified to focus on the component. In this regard, an alignment of the thermal camera may be shifted by an amount corresponding to the determined distance to correct the misalignment.

For the apparatuses, methods, and non-transitory computer readable media disclosed herein, instead of or in addition to the use of blob detection, other features such as edges of a bed on which components are manufactured, preheat plates, the platen, and other such features associated with component manufacturer may be utilized to detect thermal camera misalignment.

In examples described herein, module(s), as described herein, may be any combination of hardware and programming to implement the functionalities of the respective module(s). In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates an example layout of an apparatus for region of interest monitoring and control for additive manufacturing (hereinafter also referred to as "apparatus 100").

Referring to FIG. 1, the apparatus 100 may include a blob detection module 102 to perform a blob detection, for example, to identify blobs 104 (e.g., closed convex polygons), on first and second component images 106, 108 associated with additive manufacturing of a component 110. The first and second component images 106, 108 may include printer control language images.

A blob analysis module 112 may analyze the blobs 104 detected by the blob detection module 102. Based on the blob detection analysis performed by the blob analysis module 112, blobs that remain a same shape and include same centroids may be identified on the first and second component images 106, 108.

The blob detection module 102 may perform a further blob detection on first and second thermal images 114, 116 ascertained by a thermal camera 118. The first and second thermal images 114, 116 may be associated with the first and second component images 106, 108. That is, the first and second thermal images 114, 116 may correspond to the same print layers represented by the first and second component images 106, 108. In this regard, the first and second component images 106, 108, may represent different, but not particularly consecutive and/or adjacent images. In some examples, the first and second component images 106, 108, may refer to the same layers in a different build, which share the same computer aided design (CAD)/object model.

Based on a further blob detection analysis by the blob analysis module 112, a determination may be made as to whether one of the identified blobs 104 includes a same shape and a different centroid between the first and second thermal images 114, 116. In this regard, the size of each corresponding blob may be compared to determine any variance in the area of the blobs. For example, a variance of 5% may be considered negligible, whereas a variance greater than 5% may indicate a change in the shape of a blob. In this regard, a smaller variance for a relatively smaller blob may be considered more relevant compared to a relatively larger blob. Similarly, depending on the size of a component 110 that is being manufactured, a change in a centroid location by greater than a specified value (e.g., 0.1 mm) may represent a change in centroid locations. Further, instead of determining a change in a centroid location, the change may be determined for a bounding box if the pixel density/intensity is not sufficient for blob detection algorithms to mark a closed polygon around an object.

Further, based on a determination that the one of the identified blobs includes the same shape and the different centroid, a thermal camera alignment control module 120 may generate an indication of a thermal camera misalignment associated with the additive manufacturing. With respect to the misalignment indication, a distance between a centroid of the one of the identified blobs in the first thermal image 114 and a centroid of the one of the identified blobs in the second thermal image 116 may be determined. In this regard, affine and non-affine transformations may be performed on the thermal image to determine the exact displacement. Further, based on the determined distance, a region of interest 122 associated with the thermal camera 118 that is used to capture the first and second thermal images 114, 116 may be modified to focus on the component 110. In this regard, the thermal camera alignment control module 120 may shift an alignment of the thermal camera 118 by an amount corresponding to the determined distance to correct the misalignment.

Operation of the modules and other elements of the apparatus 100 is described in further detail with reference to FIGS. 1-8.

Figure 2:
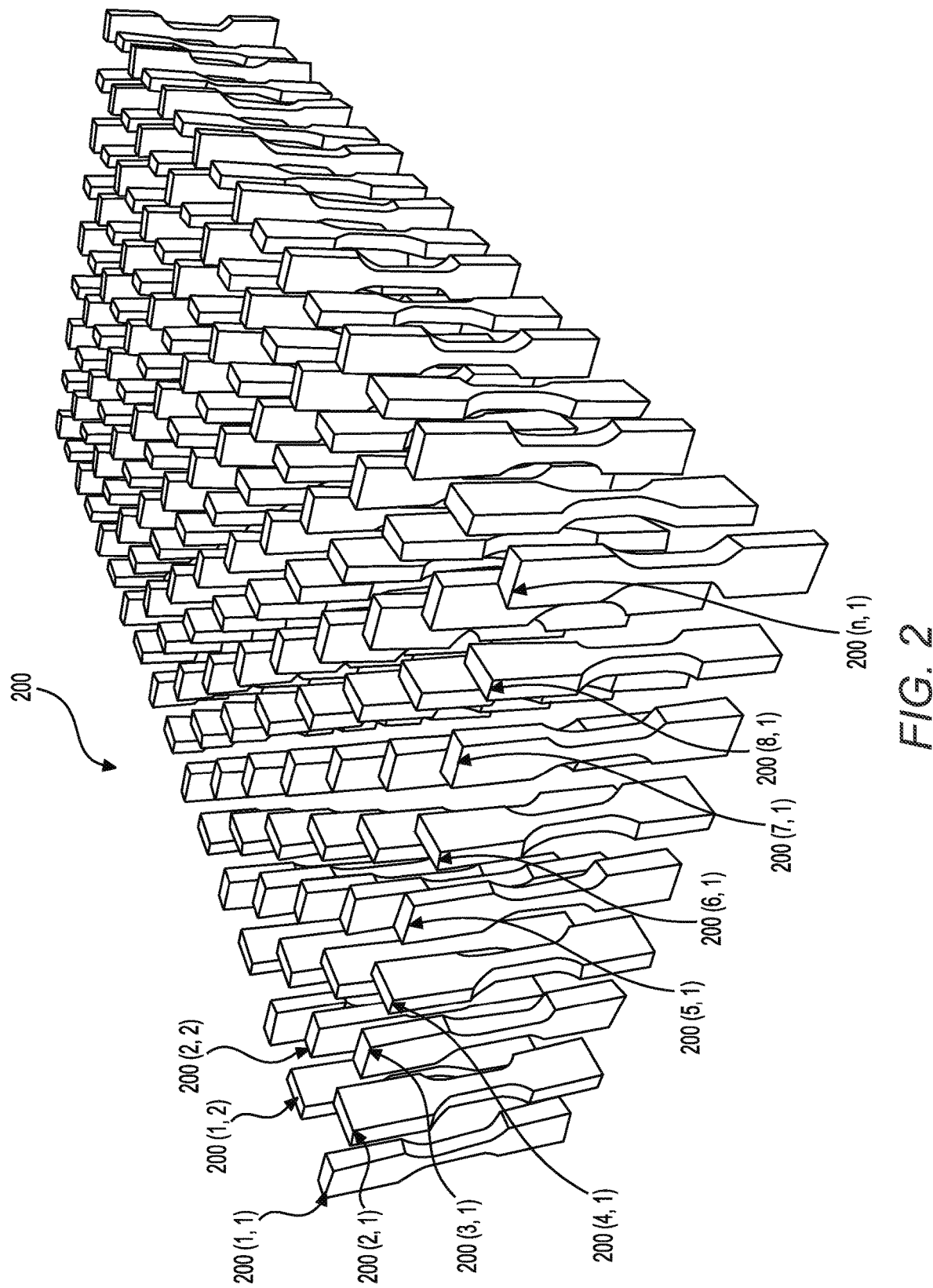
FIG. 2 illustrates an example layout of a plurality of components that are to be manufactured using additive manufacturing to illustrate operation of the apparatus of FIG. 1.

FIG. 2 illustrates an example layout of a plurality of components 200 that are to be manufactured using additive manufacturing to illustrate operation of the apparatus 100.

Referring to FIG. 2, the plurality of components 200, which may include the component 110, may be manufactured using additive manufacturing. For example, the plurality of components 200 may include components 200(1,1), 200(2,1), 200(3,1), 200(4,1), . . . , 200(n,1), 200(1,2), 200(2,2), etc., where the designations (x, y) may represent (row, column) in the orientation of FIG. 2. For the example of FIG. 2, the component 110 may be represented by any one of the components, such as the component 200(n,1).

Figure 3:
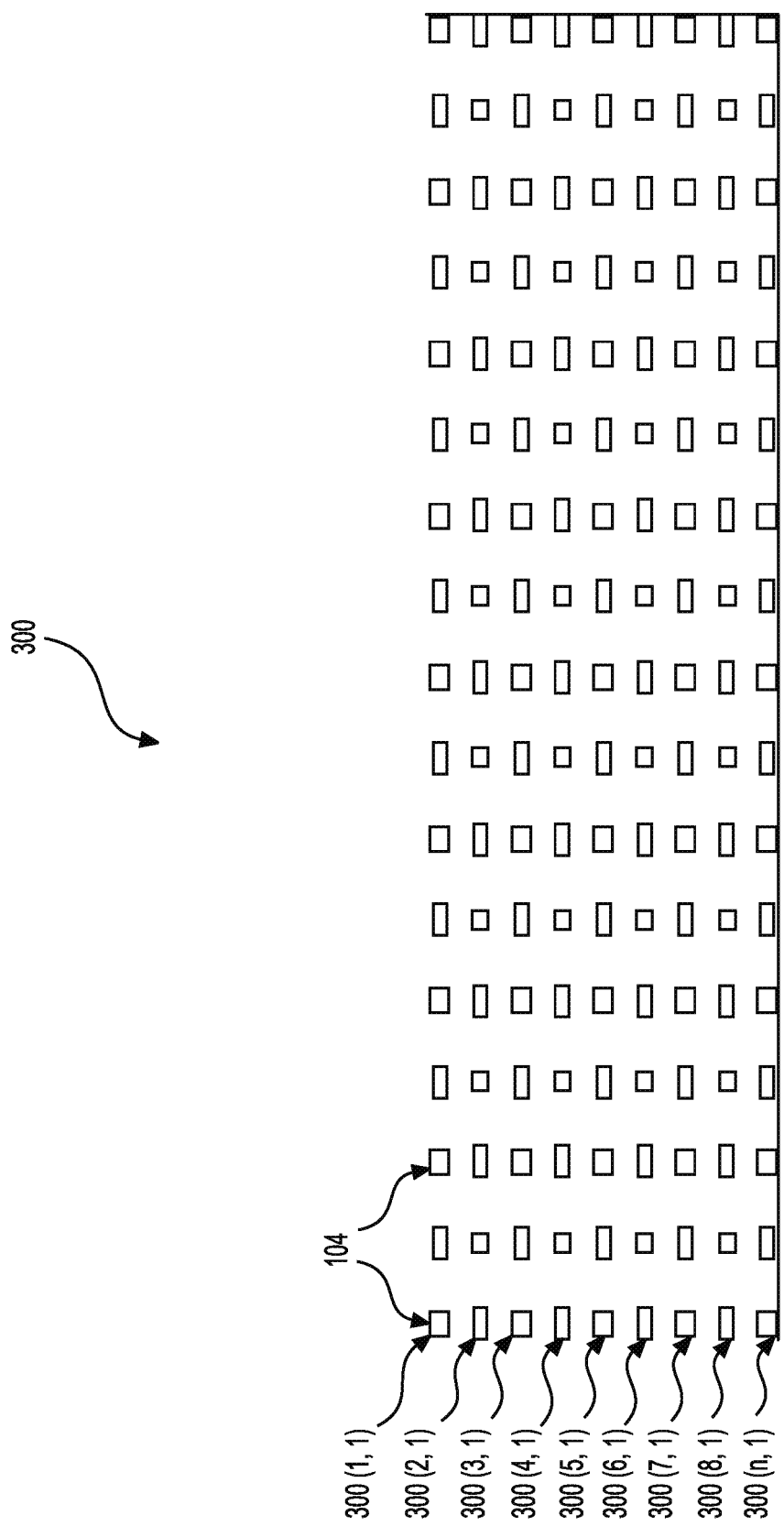
FIG. 3 illustrates a first printer control language image with blob detection results to illustrate operation of the apparatus of FIG. 1.

FIG. 3 illustrates a first printer control language image 300 (i.e., component image 106) with blob detection results to illustrate operation of the apparatus 100. Further, FIG. 4 illustrates a second printer control language image 400 (i.e., component images 108) with blob detection results to illustrate operation of the apparatus 100.

Figure 4:
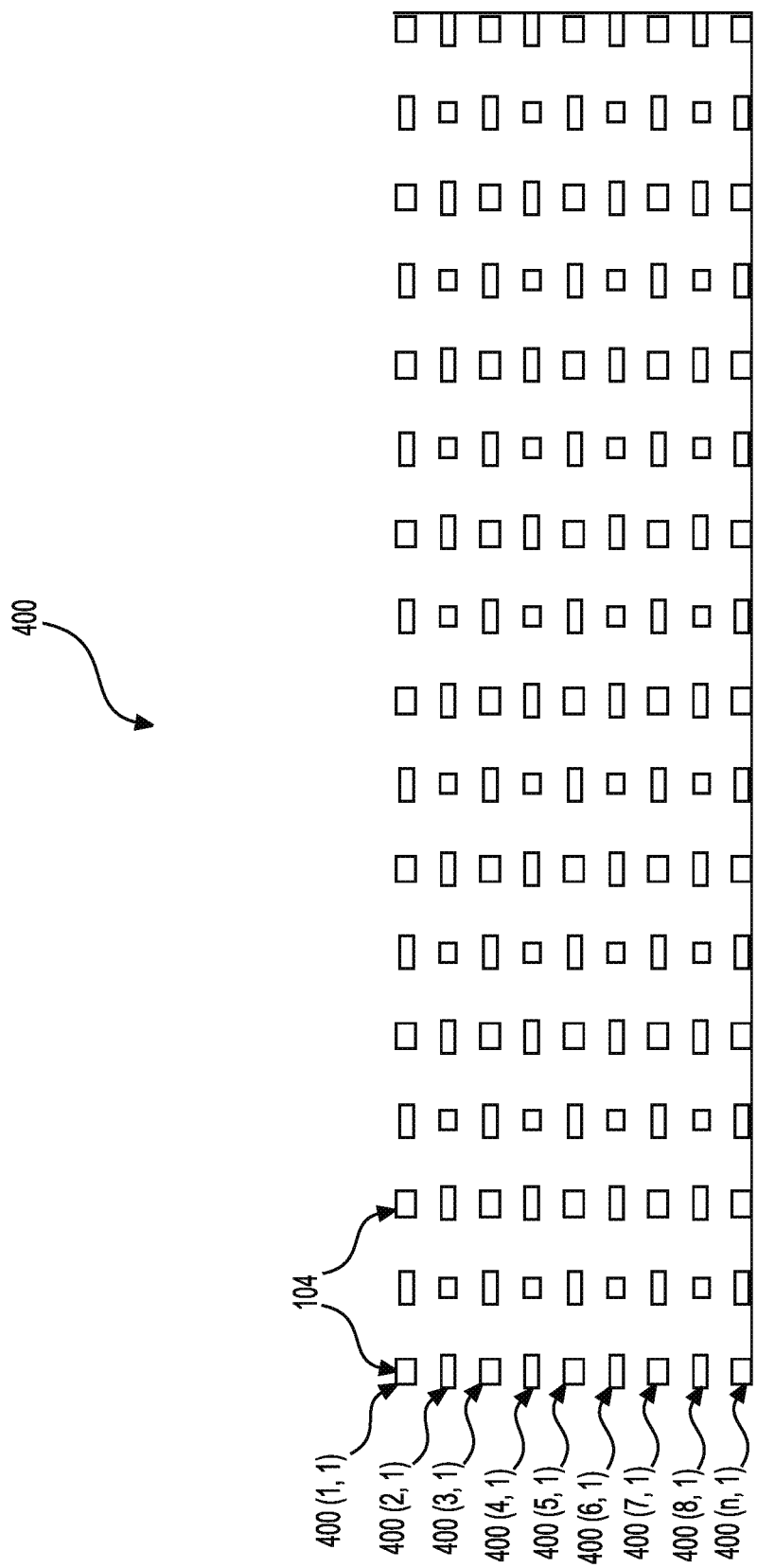
FIG. 4 illustrates a second printer control language image with blob detection results to illustrate operation of the apparatus of FIG. 1.

Referring to FIGS. 3 and 4, the blob detection module 102 may perform a blob detection, for example, to identify the blobs 104, on the first and second component images 106, 108 associated with additive manufacturing of the component 110. Further, the blob analysis module 112 may analyze the blobs 104 detected by the blob detection module 102. Based on the blob detection analysis, blobs that remain a same shape and include same centroids may be identified on the first and second component images 106, 108.

For example, referring to FIG. 3, the blobs 300(1,1), 300(2,1), . . . , 300(n,1), etc., which correspond to the components 200(1,1), 200(2,1), . . . , 200(n,1), etc., may remain a same shape and include same centroids, and may be identified on the first component image 106 (also shown in FIG. 3 with the blobs superimposed thereon).

Referring to FIG. 4, the blobs 400(1,1), 400(2,1), . . . , 400(n,1), etc., which correspond to the components 200(1,1), 200(2,1), . . . , 200(n,1), etc., may remain a same shape and include same centroids, and may be identified on the second component image 108 (also shown in FIG. 4 with the blobs superimposed thereon).

Figure 5:
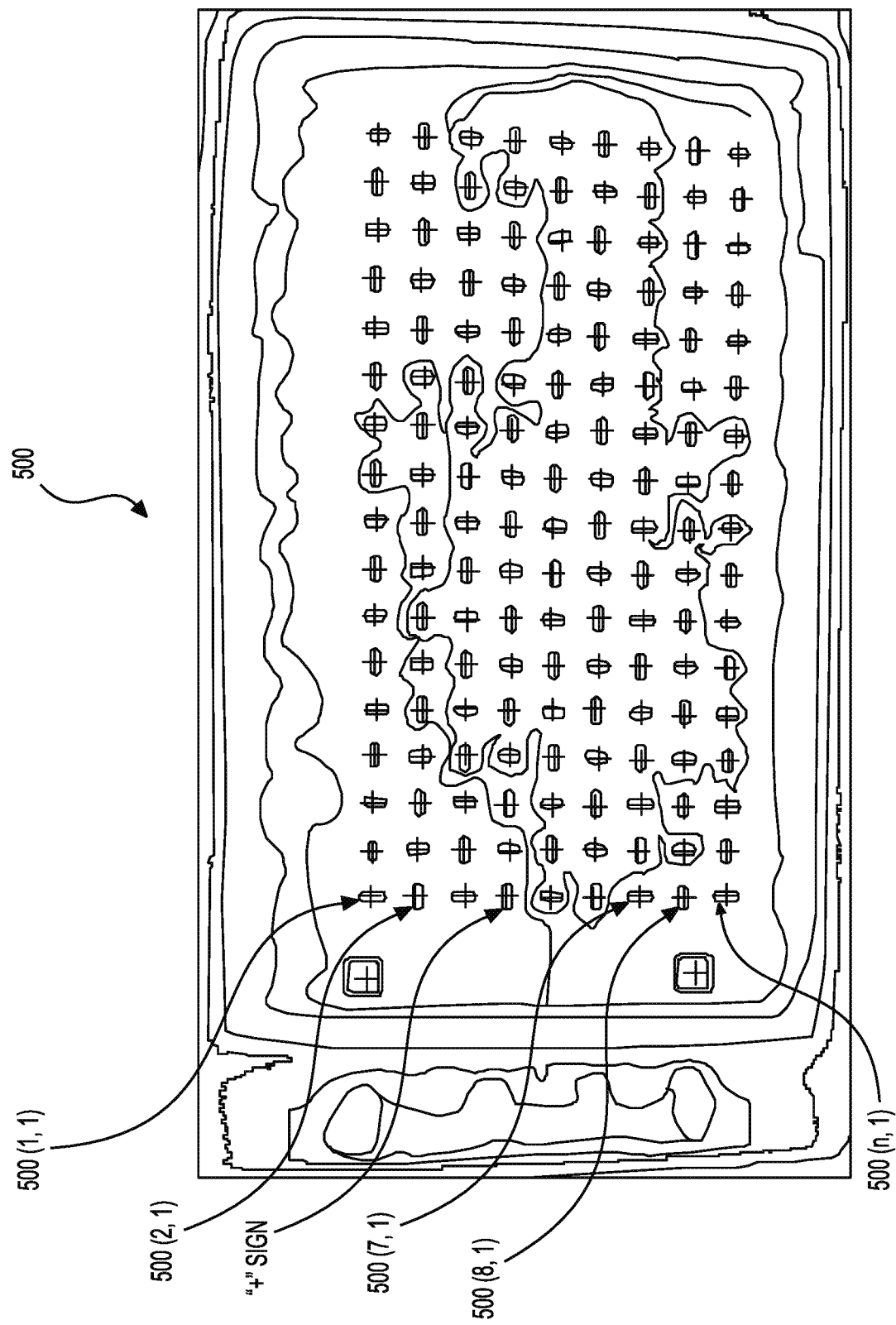
FIG. 5 illustrates region of interest positions before thermal camera misalignment for the components of FIG. 2 and the image of FIG. 3 to illustrate operation of the apparatus of FIG. 1.

FIG. 5 illustrates region of interest positions before thermal camera misalignment for the components of FIG. 2 and the image of FIG. 3 to illustrate operation of the apparatus 100.

Referring to FIG. 5, regions of interest may be represented by a centroid of the "+" signs as shown. In this regard, the areas at 500 may correspond to areas of the components 200 of FIG. 2. For example, the areas 500(1,1), 500(2,1), . . . , 500(6,1), 500(7,1), 500(8,1), 500(n,1), etc., may correspond to the components 200(1,1), 200(2,1), . . . , 200(6,1), 200(7,1), 200(8,1), 200(n,1), etc. For the example of FIG. 5, the regions of interest are shown as being aligned with the corresponding areas of the components 200.

Figure 6:
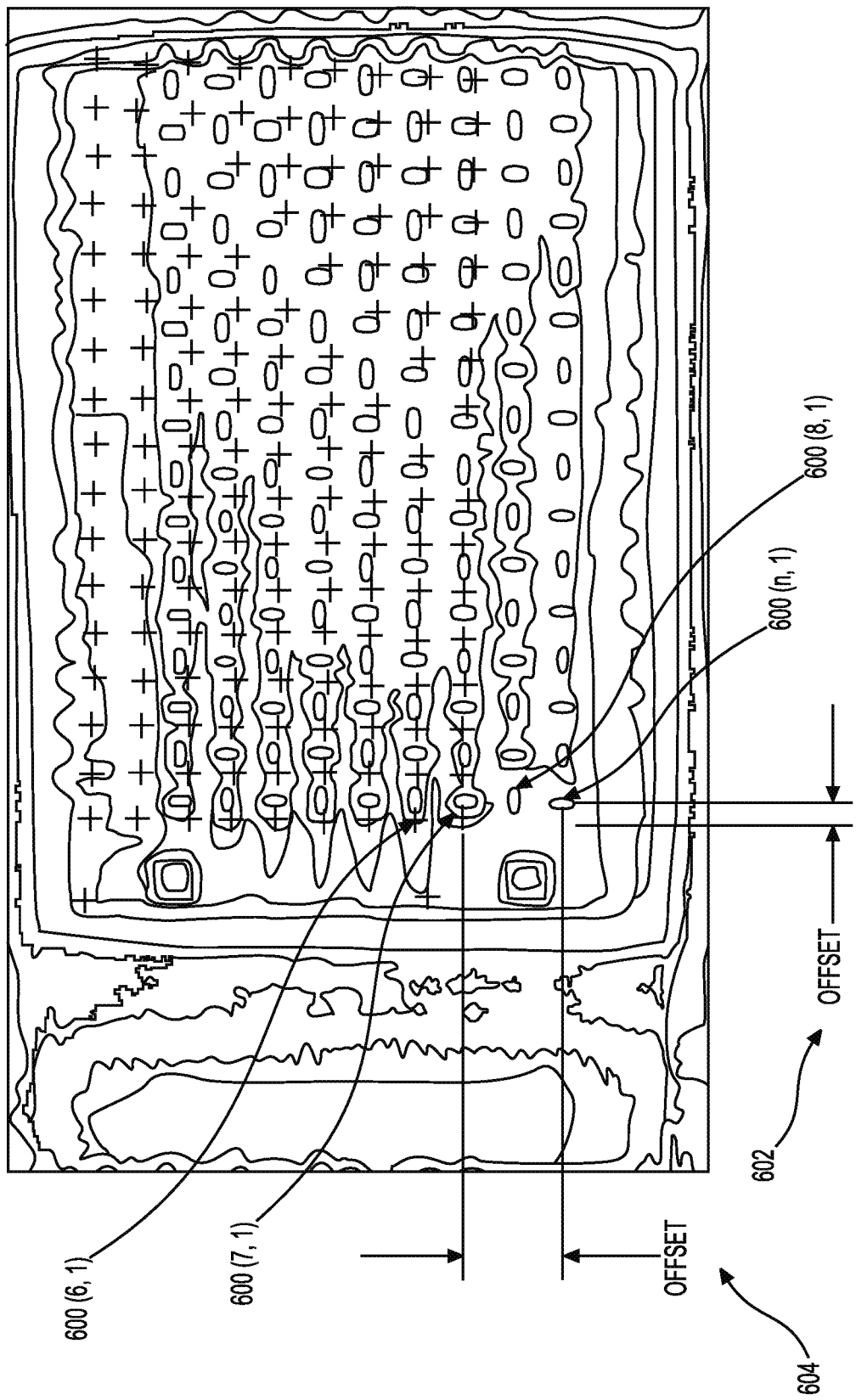
FIG. 6 illustrates region of interest positions after thermal camera misalignment for the components of FIG. 2 and the image of FIG. 4 to illustrate operation of the apparatus of FIG. 1.

FIG. 6 illustrates region of interest positions after thermal camera misalignment for the components of FIG. 2 and the image of FIG. 4 to illustrate operation of the apparatus 100. In this regard, the definition of the regions of interest may remain the same for each thermal image (e.g., see FIGS. 5 and 6).

Referring to FIG. 6, compared to FIG. 5, the regions of interest are shown as being misaligned compared to the corresponding areas of the components 200. For example, the areas 600(6,1), 600(7,1), 600(8,1), 600(n,1), etc., of FIG. 6 may correspond to areas 500(6,1), 500(7,1), 500(8,1), 500(n,1), etc., of FIG. 5, which may correspond to the components 200(6,1), 200(7,1), 200(8,1), 200(n,1), etc., shown in FIG. 2, etc. In the example of FIG. 6, the corresponding regions of interest are shown as being shifted to the left and upwards in the orientation of FIG. 6. Thus, each region of interest is shown at an offset as shown at 602 (e.g., x-offset in the orientation of FIG. 6) and 604 (e.g., y-offset in the orientation of FIG. 6) from the centroid of the corresponding components 200.

Figure 7A:
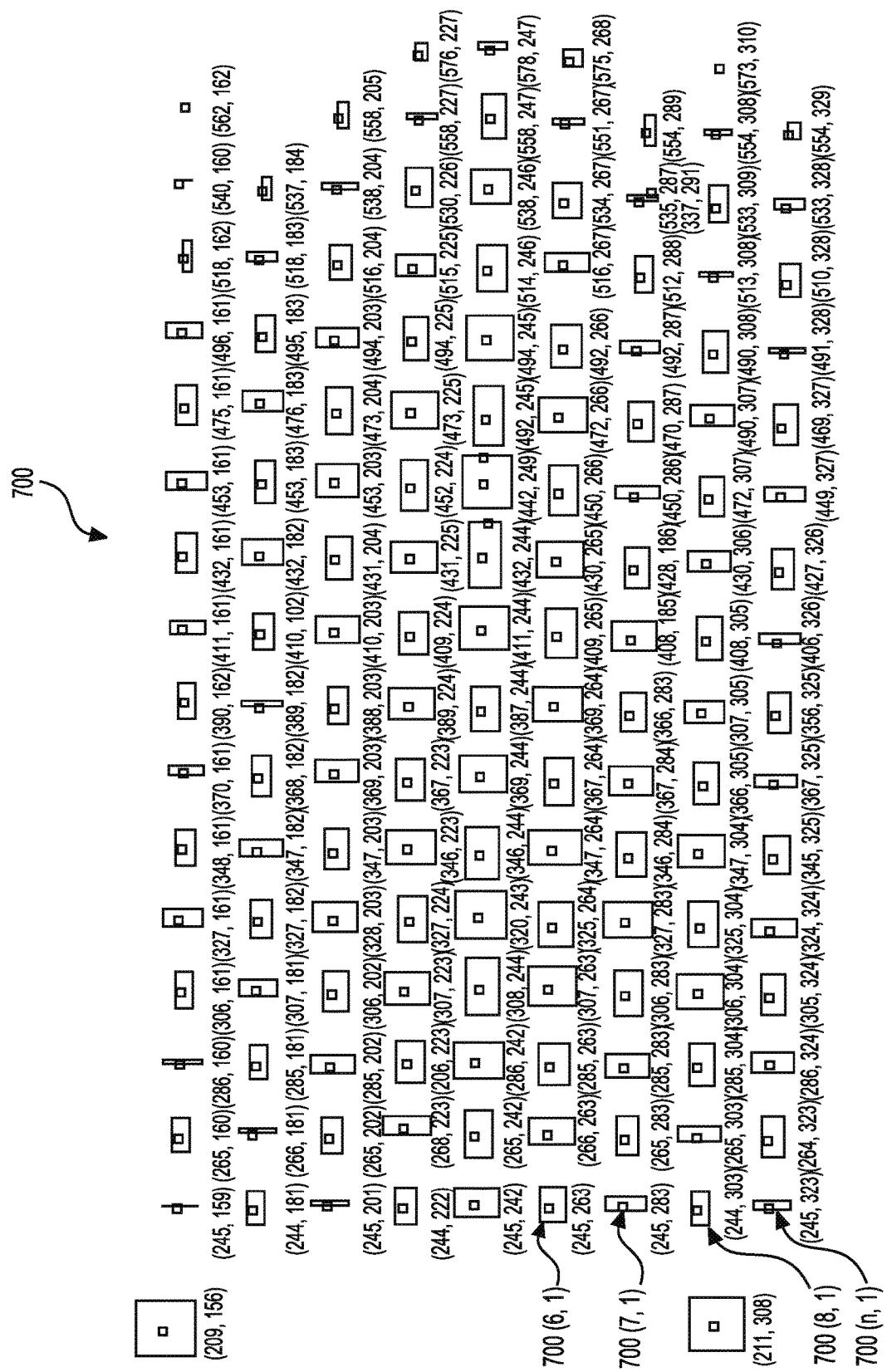
FIG. 7A illustrates detected blobs and their centroids for the components of FIG. 2 and the thermal image of FIG. 5 to illustrate operation of the apparatus of FIG. 1.
Figure 7B:
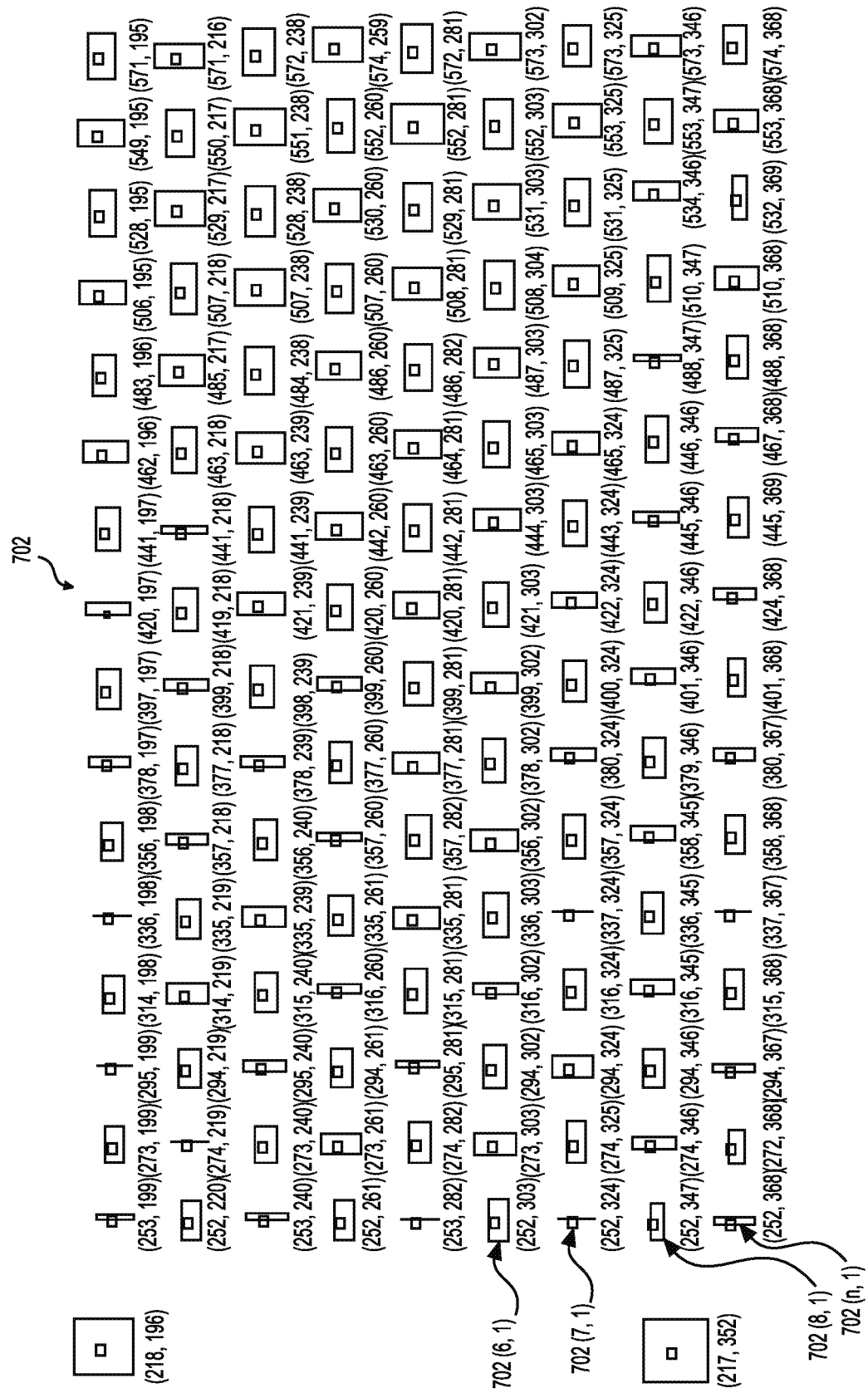
FIG. 7B illustrates detected blobs and their sifted centroids for the components of FIG. 2 and the thermal image of FIG. 6 to illustrate operation of the apparatus of FIG. 1.

FIG. 7A illustrates detected blobs and their non-shifted centroids for the components of FIG. 2 and the thermal image of FIG. 5 to illustrate operation of the apparatus 100. FIG. 7B illustrates detected blobs and their sifted centroids for the components of FIG. 2 and the thermal image of FIG. 6 to illustrate operation of the apparatus 100.

Referring to FIG. 7A, compared to the blob detection results of FIG. 3, the centroids for the blobs 700(6,1), 700(7,1), 700(8,1), 700(n,1), etc., are shown without any shift. For example, the centroids for the blobs 700(6,1), 700(7,1), 700(8,1), 700(n,1), etc., include coordinates (245, 263), (245, 283), (245, 303), (245, 323), etc., for the example of FIG. 7A. Moreover, the shape of the blobs 700(6,1), 700(7,1), 700(8,1), 700(n,1), etc., remains the same between the first and second thermal images 114, 116 of FIGS. 5 and 6. However, referring to FIG. 7B, compared to the blob detection results of FIG. 4, the centroids for the blobs 702(6,1), 702(7,1), 702(8,1), 702(n,1), etc., are shown as being shifted due to the region of interest shift shown in FIG. 6. For example, the centroids for the blobs 702(6,1), 702(7,1), 702(8,1), 702(n,1), etc., include coordinates (252, 303), (252, 324), (252, 347), (252, 368), etc. In this regard, the shape of the blobs 702(6,1), 702(7,1), 702(8,1), 702(n,1), etc., remains the same between the first and second thermal images 114, 116 of FIGS. 5 and 6.

Figure 8:
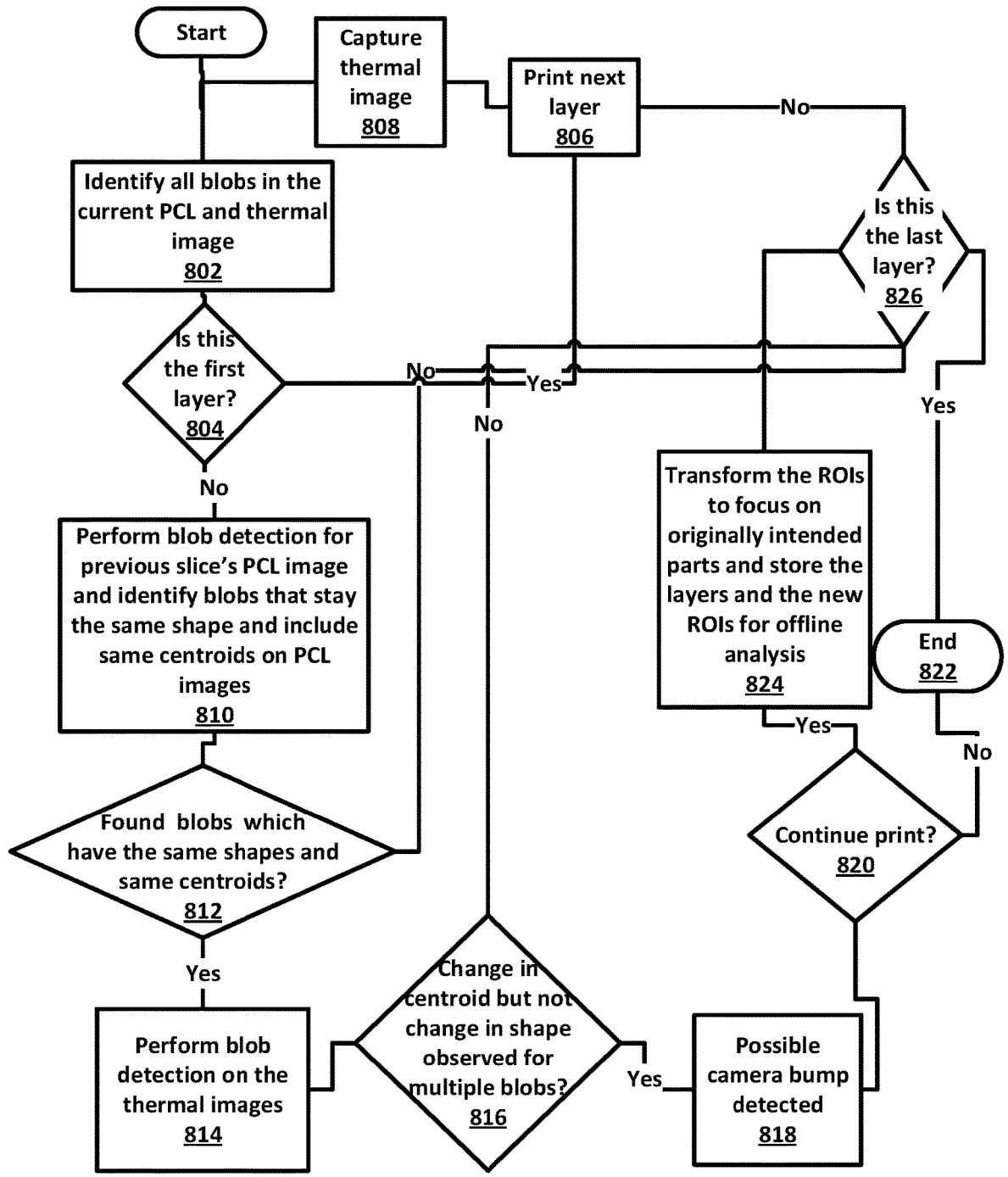
FIG. 8 illustrates an example flowchart for region of interest monitoring and control for additive manufacturing.

FIG. 8 illustrates an example flowchart for region of interest monitoring and control for additive manufacturing.

Referring to FIG. 8, at block 802, operation of the apparatus 100 may commence with identification of all blobs in the current printer control language and thermal images. For example, the blob detection module 102 may perform a blob detection, for example, to identify blobs 104, on a first component image 106 associated with additive manufacturing of a component 110.

At block 804, the blob analysis module 112 may determine if the component image 106 represents a first layer of the component 110.

Based on a determination at block 804 that the component image 106 represents the first layer of the component 110, at block 806, a next layer of the component 110 may be printed.

At block 808, the thermal camera 118 may capture a thermal image of the next printed layer.

At block 810, based on the availability of the first and second component images 106, 108, and the first and second thermal images 114, 116, the blob analysis module 112 may analyze the blobs 104 detected by the blob detection module 102. Thus the blob detection analysis as disclosed herein may be performed on consecutive layers of the component 110. Based on the blob detection analysis, blobs that remain a same shape and include same centroids may be identified on the first and second component images 106, 108 (e.g., see also discussion with respect to FIGS. 2-4).

At block 812, the blob analysis module 112 may determine whether blobs that remain the same shape and include same centroids have been identified on the first and second component images 106, 108. In this regard, there may be cases where the blob detection is focusing on relatively close features/objects. In such a case, the blobs may be clustered (e.g., by their centroid separation distance), and clusters that are relatively large and sparsely populated may be considered.

At block 814, the blob detection module 102 may perform a further blob detection on the first and second thermal images 114, 116 ascertained by the thermal camera 118. The first and second thermal images 114, 116 may be associated with the first and second component images 106, 108.

At block 816, based on a further blob detection analysis by the blob analysis module 112, a determination may be made as to whether one of the identified blobs includes a same shape and a different centroid (or bounding box coordinates (e.g., top left and bottom right)) between the first and second thermal images 114, 116 (e.g., see also discussion with respect to FIGS. 2-7B).

At block 818, based on a determination that the one of the identified blobs includes the same shape and the different centroid, the thermal camera alignment control module 120 may generate an indication of a thermal camera misalignment associated with the additive manufacturing.

At block 820, an operator that controls printing of the component 110 may be requested to confirm whether to continue printing of the component 110. Alternatively, the operation with respect to block 820 may be automated in that the process flow may be gated (e.g., no camera bumping signal means that this build is acceptable for analysis). In some examples, data that is considered may be limited to data until the camera bumping.

Based on a determination at block 820 that printing is to discontinue, at block 822, printing of the component 110 may be stopped.

At block 824, the regions of interest may be shifted to focus on the originally intended points of interest (e.g., shifted back from the example position of FIG. 6 to the position of FIG. 5). In this regard, a shift may be excessive in that the thermal camera may no longer focus on the bed. In such a case, appropriate regions of interest may be identified and flagged for further analysis. Further, the layers that have been printed and the new regions of interest may be stored for off-line analysis. In this regard, if a print job for the component 110 cannot be stopped, the regions of interest may be transformed for offline analysis, or both previous and new versions of regions of interest may be maintained along with layer information from when the thermal camera misalignment appeared. Alternatively, a distance between a centroid of the one of the identified blobs in the first thermal image 114 and a centroid of the one of the identified blobs in the second thermal image 116 may be determined (e.g., see offsets 602 and 604 shown in FIG. 6). Further, based on the determined distance, a region of interest 122 associated with the thermal camera 118 that is used to capture the first and second thermal images 114, 116 may be modified to focus on the component 110. In this regard, the thermal camera alignment control module 120 may shift an alignment of the thermal camera 118 by an amount corresponding to the determined distance (e.g., see offsets 602 and 604 shown in FIG. 6) to correct the misalignment.

At block 826, a determination may be made as to whether the last layer of the component 110 has been printed. Thereafter, further processing may proceed to either block 822 where printing is stopped, or to block 806 where the next layer for the component 110 is printed.

Figure 9:
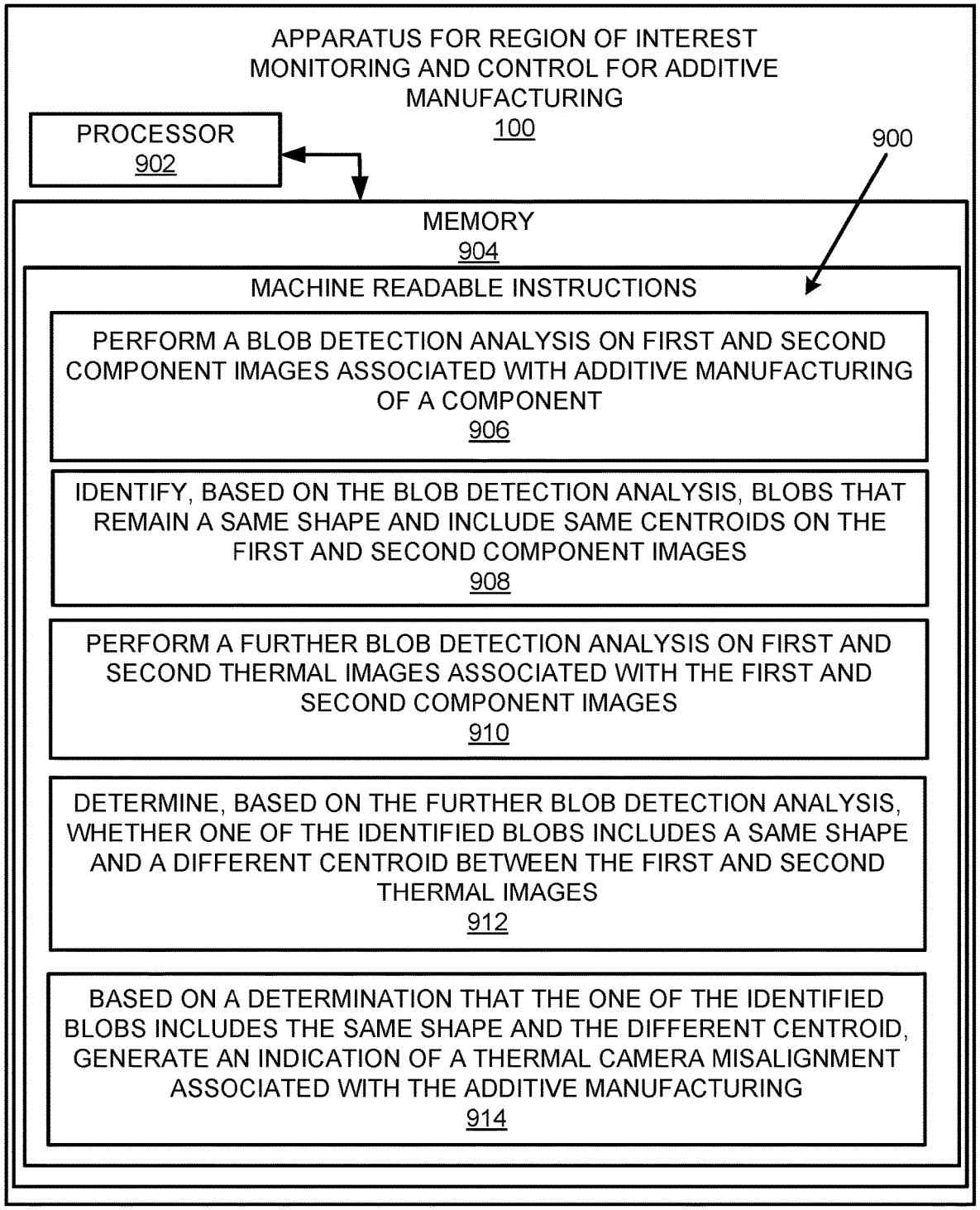
FIG. 9 illustrates an example block diagram for region of interest monitoring and control for additive manufacturing.
Figure 11:
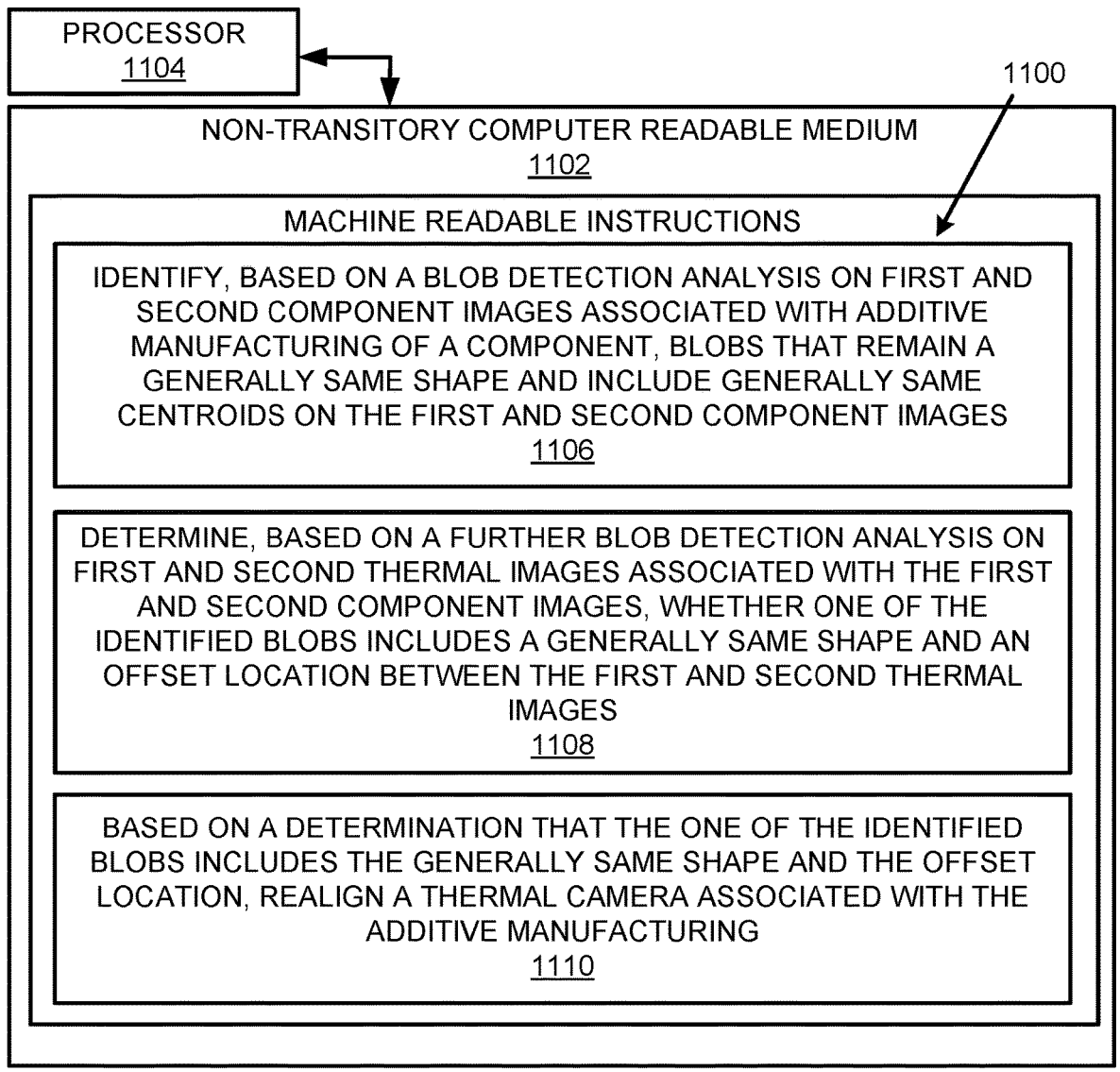
FIG. 11 illustrates a further example block diagram for region of interest monitoring and control for additive manufacturing.

FIGS. 9-11 respectively illustrate an example block diagram 900, an example flowchart of a method 1000, and a further example block diagram 1100 for region of interest monitoring and control for additive manufacturing. The block diagram 900, the method 1000, and the block diagram 1100 may be implemented on the apparatus 100 described above with reference to FIG. 1 by way of example and not limitation. The block diagram 900, the method 1000, and the block diagram 1100 may be practiced in other apparatus. In addition to showing the block diagram 900, FIG. 9 shows hardware of the apparatus 100 that may execute the instructions of the block diagram 900. The hardware may include a processor 902, and a memory 904 (i.e., a non-transitory computer readable medium) storing machine readable instructions that when executed by the processor 902 cause the processor to perform the instructions of the block diagram 900. The memory 904 may represent a non-transitory computer readable medium. FIG. 10 may represent a method for region of interest monitoring and control for additive manufacturing. FIG. 11 may represent a non-transitory computer readable medium 1102 having stored thereon machine readable instructions to provide region of interest monitoring and control for additive manufacturing. The machine readable instructions, when executed, cause a processor 1104 to perform the instructions of the block diagram 1100 also shown in FIG. 11.

The processor 902 of FIG. 9 and/or the processor 1104 of FIG. 11 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1102 of FIG. 11), such as hardware storage devices (e.g., RAM (random access memory), ROM (read only memory), EPROM (erasable, programmable ROM), EEPROM (electrically erasable, programmable ROM), hard drives, and flash memory). The memory 904 may include a RAM, where the machine readable instructions and data for a processor may reside during runtime.

Referring to FIGS. 1-9, and particularly to the block diagram 900 shown in FIG. 9, the memory 904 may include instructions 906 to perform a blob detection analysis on first and second component images associated with additive manufacturing of a component.

The processor 902 may fetch, decode, and execute the instructions 908 to identify, based on the blob detection analysis, blobs that remain a same shape and include same centroids on the first and second component images.

The processor 902 may fetch, decode, and execute the instructions 910 to perform a further blob detection analysis on first and second thermal images associated with the first and second component images.

The processor 902 may fetch, decode, and execute the instructions 912 to determine, based on the further blob detection analysis, whether one of the identified blobs includes a same shape and a different centroid between the first and second thermal images.

Based on a determination that the one of the identified blobs includes the same shape and the different centroid, the processor 902 may fetch, decode, and execute the instructions 914 to generate an indication of a thermal camera misalignment associated with the additive manufacturing.

Referring to FIGS. 1-8 and 10, and particularly FIG. 10, for the method 1000, at block 1002, the method may include identifying, based on blob detection analysis on first and second component images associated with additive manufacturing of a component, blobs that remain a generally same shape and include generally same centroids on the first and second component images.

At block 1004, the method may include determining, based on a further blob detection analysis on first and second thermal images associated with the first and second component images, whether a plurality of the identified blobs include generally same shapes and different centroids between the first and second thermal images.

At block 1006, based on a determination that the plurality of the identified blobs include the generally same shapes and the different centroids, the method may include generating an indication of a thermal camera misalignment associated with the additive manufacturing.

At block 1008, the method may include performing, based on the generated indication, a corrective action to realign a thermal camera that includes the thermal camera misalignment.

Referring to FIGS. 1-8 and 11, and particularly FIG. 11, for the block diagram 1100, the non-transitory computer readable medium 1102 may include instructions 1106 to identify, based on a blob detection analysis on first and second component images associated with additive manufacturing of a component, blobs that remain a generally same shape and include generally same centroids on the first and second component images.

The processor 1104 may fetch, decode, and execute the instructions 1108 to determine, based on a further blob detection analysis on first and second thermal images associated with the first and second component images, whether one of the identified blobs includes a generally same shape and an offset location between the first and second thermal images.

Based on a determination that the one of the identified blobs includes the generally same shape and the offset location, the processor 1104 may fetch, decode, and execute the instructions 1110 to realign a thermal camera associated with the additive manufacturing.

What has been described and illustrated herein is an example along with some of its variations. The terms, descriptions and figures used herein are set forth by way of illustration and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a processor, and
   a non-transitory computer readable medium storing machine readable instructions that when executed by the processor cause the processor to:
   perform a blob detection analysis on first and second component images of layers of a component associated with a three-dimensional (3D) additive manufacturing of the component;
   identify, based on the blob detection analysis, blobs in the first and second component images that remain a same shape and include same centroids;
   perform a further blob detection analysis on first and second thermal images taken by a thermal camera of the layers of the component associated with the first and second component images;
   determine, based on the further blob detection analysis, that one of the identified blobs includes a same shape and a different centroid between the first and second thermal images;
   based on the determination that the one of the identified blobs includes the same shape and the different centroid, determine a distance between a centroid of the one of the identified blobs in the first thermal image and a centroid of the one of the identified blobs in the second thermal image; and
   modify, based on the determined distance, a region of interest associated with a thermal camera that is used to capture the first and second thermal images to focus on the component.

2. The apparatus according to claim 1, wherein the first and second component images include printer control language (PCL) images.

3. The apparatus according to claim 1, wherein the machine readable instructions further cause the processor to:
   based on the determination that the one of the identified blobs includes the same shape and the different centroid, generate an indication of a misalignment of the thermal camera associated with the 3D additive manufacturing.

4. The apparatus according to claim 1, wherein to modify, based on the determined distance, the region of interest associated with the thermal camera that is used to capture the first and second thermal images to focus on the component, the machine readable instructions cause the processor to:
   shift an alignment of the thermal camera by an amount corresponding to the determined distance.

5. The apparatus according to claim 1, wherein to perform the blob detection analysis on the first and second component images, the machine readable instructions cause the processor to:
   perform the blob detection analysis to identify closed convex polygons on the first and second component images associated with the 3D additive manufacturing of the component.

6. The apparatus according to claim 1, wherein the 3D additive manufacturing of the component includes multi jet fusion based manufacturing of the component.

7. A computer implemented method comprising:
   identifying, based on a blob detection analysis on first and second component images of layers of a component associated with a three-dimensional (3D) additive manufacturing of the component, blobs in the first and second component images that remain a same shape and include same centroids;
   based on a further blob detection analysis on first and second thermal images taken by a thermal camera of the layers of the component associated with the first and second component images, determining that a plurality of the identified blobs in the first and second thermal images include same shapes and different centroids between the first and second thermal images;
   based on the determination that the plurality of the identified blobs in the first and second thermal images include the same shapes and the different centroids, determining a distance between a centroid of one of the plurality of identified blobs in the first thermal image and a centroid of a corresponding one of the plurality of identified blobs in the second thermal image; and
   modifying, based on the determined distance, a region of interest associated with the thermal camera to perform a corrective action to realign the thermal camera.

8. The method according to claim 7, further comprising: based on the determination that the plurality of the identified blobs in the first and second thermal images include the same shapes and the different centroids, generating an indication of a misalignment of the thermal camera associated with the 3D additive manufacturing.

9. The method according to claim 7, wherein modifying, based on the determined distance, the region of interest associated with the thermal camera further comprises:
   shifting an alignment of the thermal camera by an amount corresponding to the determined distance.

10. The method according to claim 7, wherein identifying, based on the blob detection analysis on the first and second component images associated with the 3D additive manufacturing of the component, blobs that remain the same shape and include same centroids on the first and second component images further comprises:
    identifying, based on the blob detection analysis to identify closed convex polygons on the first and second component images associated with the 3D additive manufacturing of the component, blobs that remain the same shape and include same centroids on the first and second component images.

11. The method according to claim 7, wherein identifying, based on the blob detection analysis on the first and second component images associated with the 3D additive manufacturing of the component, blobs that remain the same shape and include same centroids on the first and second component images further comprises:

identifying, based on the blob detection analysis on the first and second component images associated with the 3D additive manufacturing that includes multi jet fusion based manufacturing of the component, blobs that remain the same shape and include same centroids on the first and second component images.

12. A non-transitory computer readable medium storing machine readable instructions that, when executed, cause a processor to:

identify, based on a blob detection analysis on first and second component images of layers of a component associated with a three-dimensional (3D) additive manufacturing of the component, blobs in the first and second component images that remain a same shape and include same centroids;

based on a further blob detection analysis on first and second thermal images taken by a thermal camera of the layers of the component associated with the first and second component images, determine that one of the identified blobs includes a same shape and a different centroid between the first and second thermal images; and based on the determination that the one of the identified blobs includes the same shape and the different centroid, realign the thermal camera associated with the 3D additive manufacturing, including causing the processor to:

determine a distance between a centroid of the one of the identified blobs in the first thermal image and a centroid of the one of the identified blobs in the second thermal image, and based on the determined distance, modify a region of interest associated with the thermal camera.

13. The non-transitory computer readable medium according to claim 12, wherein the machine readable instructions further cause the processor to:

based on the determination that the one of the identified blobs includes the same shape and the different centroid, generate an indication of a misalignment of the thermal camera associated with the 3D additive manufacturing.

14. The non-transitory computer readable medium according to claim 12, wherein, to modify, based on the determined distance, the region of interest associated with the thermal camera, the machine readable instructions cause the processor to:

shift an alignment of the thermal camera by an amount corresponding to the determined distance.

15. The non-transitory computer readable medium according to claim 12, wherein the machine readable instructions cause the processor to:

identify, based on the blob detection analysis to identify closed convex polygons on first and second component images associated with the 3D additive manufacturing of the component, blobs that remain the same shape and include same centroids on the first and second component images.

* * * * *